United States Patent [19]

Eilon Ginsburg

[11] Patent Number: 4,967,373

[45] Date of Patent: Oct. 30, 1990

[54] MULTI-COLORED DOT DISPLAY DEVICE

[75] Inventor: Eilon Ginsburg, Ramat-Gan, Israel

[73] Assignee: COMFUTURE, Visual Information Management Systems, Ramat-Gan, Israel

[21] Appl. No.: 169,039

[22] Filed: Mar. 16, 1988

[51] Int. Cl.[5] .......... G06F 3/00

[52] U.S. Cl. .......... 364/518; 340/703; 340/701; 340/750

[58] Field of Search .......... 364/518, 521, 200 MS File, 364/900 MS File; 340/750, 703, 744, 701, 784, 750

[56] References Cited

U.S. PATENT DOCUMENTS

| | | | |
|---|---|---|---|
| 3,740,570 | 6/1973 | Kaelin et al. | 307/40 |
| 3,909,788 | 9/1975 | Kaelin et al. | 340/166 R |
| 4,024,531 | 5/1977 | Ashby | 340/334 |
| 4,070,710 | 1/1978 | Sukonick et al. | 364/900 |
| 4,162,493 | 7/1979 | Ross et al. | 340/752 |
| 4,296,476 | 10/1981 | Mayer et al. | 364/900 |
| 4,342,029 | 7/1982 | Hofmanis et al. | 340/703 |
| 4,420,711 | 12/1983 | Takahashi et al. | 315/296 |
| 4,471,463 | 9/1984 | Mayer et al. | 364/900 |
| 4,647,927 | 3/1987 | Ichikawa et al. | 340/801 |
| 4,648,050 | 3/1987 | Yamagami | 364/526 |
| 4,673,929 | 6/1987 | Nelson et al. | 340/703 |
| 4,689,613 | 8/1987 | Ikeda | 340/703 |
| 4,737,772 | 4/1988 | Nishi et al. | 340/703 |
| 4,800,375 | 1/1989 | Silverstein et al. | 370/703 |

*Primary Examiner*—Gary V. Harkcom
*Assistant Examiner*—Michael A. Jaffe
*Attorney, Agent, or Firm*—Oblon, Spivak, McClelland, Maier & Neustadt

[57] ABSTRACT

A multi-colored dot matrix display device and its controller which has a microprocessor and address buffers, data buffers and video memory planes. Each video memory plane has an associated address buffer and an associated data buffer. A graph control data circuit controls each video plane of memory and a colored pallet to control the display, on the dot matrix display device. The pallet control circuit is used to determine the actual color which is displayed from each video memory plane which controls the final color which is displayed on the dot display device.

7 Claims, 5 Drawing Sheets

MULTI-COLORED DOT DISPLAY DEVICE

BACKGROUND OF THE INVENTION

1. Field of the Invention

The present invention relates to a display device having a display element array obtained by aligning display elements, such as light emitting diodes in a matrix form. More particularly, the present invention relates to a display device in which multicolored display elements are aligned next to each other to form the matrix.

DISCUSSION OF THE BACKGROUND

Conventionally, display devices have either been limited to monochrome displays such as red dots on black background or have used display elements other than a matrix-type display. The problem with conventional devices which use display elements other than a matrix-type display is that in these devices, which commonly use a display device such as a CRT or other raster scanning type device, require a significant amount of central processor power in order to form the graphic image on the raster display device and to provide a means to redraw the images on each of the scan lines. Further these types of devices are limited in size or brightness.

Prior art devices which utilize matrix arrangements, such as a light emitting diode display device, are generally only able to display rather simplistic messages without the ability to display graphics, moving messages or other items which are attention getting thereby limiting the display device. If the device is able to display graphics along with text these "attention getters" require significant processor capability so as to drive the display.

In order to eliminate the drawbacks of these two type of prior art displays and to minimize the amount of processor overhead involved in creating a multicolor display device, this invention allows for multiple effects to be created on the dot display device without putting any significant load on the central processing unit. Furthermore, the present invention allows for rapid color changes in the final display so as to provide a sense of animation which has heretofore been unavailable in prior art displays.

Furthermore, the instant invention is applicable to dot display devices of varying sizes without changing the basic structure or circuitry of the entire invention.

SUMMARY OF THE INVENTION

It is an object of the present invention to provide a display device in which a CPU having minimal power is used for controlling a specialized graphic control data circuit which is still able to drive a multi-dot, multi-line and multi-color display.

It is still another object of the present invention to provide a drive circuit for the dot display device which allows for an animation effect to occur on the finished display by using moving pictures.

It is further an object of this invention to provide a means by which a foreground picture and a background picture may be produced on the display without the necessity of the CPU being involved in redrawing the two displays during each display cycle.

Furthermore, it is an object of this invention to allow a rapid change in color is either a foreground image or the background image or both to occur within the final dot display device without the necessity of the CPU redrawing the data in either the foreground or the background images on a repetitive basis.

It is yet another object of this invention to provide a means by which a static picture can have an illusion of movement by providing for a rapid change of color with a minimal processing load on the central processing unit.

BRIEF DESCRIPTION OF THE DRAWINGS

A more complete appreciation of this invention and many of the attendant advantages thereof will be readily obtained as the same becomes better understood by reference to the detailed description which follows when considered in connection with the accompanying drawings, wherein.

DETAILED DESCRIPTION OF THE PREFERRED EMBODIMENTS

Figure 1:
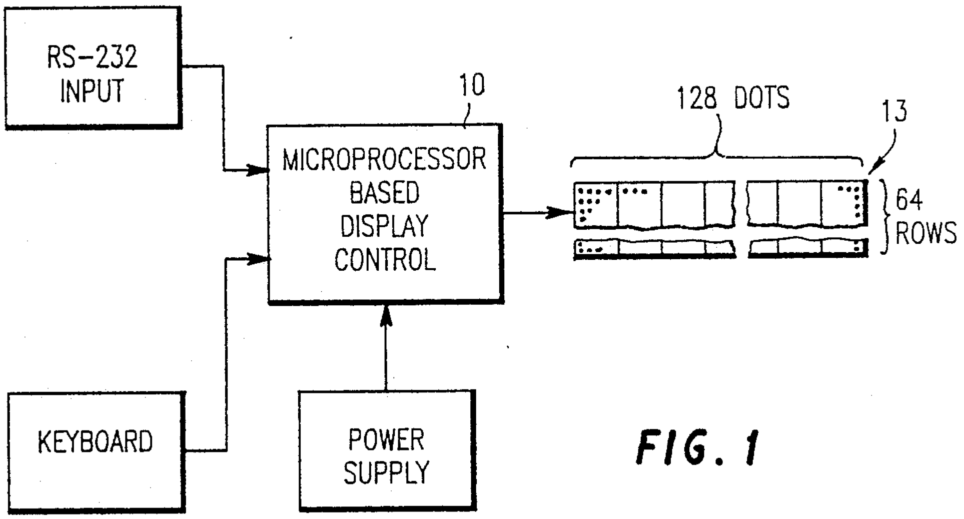
FIG. 1 is an overview of the general structure of this invention and prior art systems.

FIG. 1 shows the basic arrangement of both this invention and the prior art with respect to a means for driving a dot display device. In this figure, a display control 10 which contains a micro processor, is used to drive the dot display device forming the final display. However, in prior art devices this display control 10 normally uses a CPU which has a significant level of power so that the next line of dots in the final image to be displayed on the dot display can be created and processed into "the dot control" information. Therefore in prior art systems each individual line of dots is formed by the CPU on each display cycle for a given line of dots. A system of this type is shown in Ashby, U.S. Pat. No. 4,024,531. To expand the display size of the Ashby system the processor power would have to be increased both in speed and size. The present invention, on the other hand, as will be apparent from the description below, enables an increase in the size of the final display with only a minimal (if any) additional load on the processor unit.

Using as an illustrative example a display device as is shown in FIG. 1, a dot display device 13, which is 64 lines by 128 dots is able to be driven both by this invention or by prior art systems. However, the manner in which the dot display 13 is driven is completely different. Further, it should be noted that displays of varying size may be accomplished in this invention using the same basic structure which will be described below. This is not the case in prior art systems. Specifically, a dot display having a resolution of 32 lines of 128 dots or 16 lines of 128 is easily implemented using an almost identical structure to the structure which will be discussed below. The dot display device contemplated in this embodiment uses two different colored dots at each position in a 64 lines of 128 dot display. Specifically, the dots can be made up of LED's may be either red or green or with a combination of the two dots being lit an orange color. Black appears when neither of the two dots are lit. Furthermore, individual dot's in any color may appear as if they are flashing or solid as will be explained below.

Two sets of images may be displayed on the device at the same time with one of the images being designated as a foreground image and the other image being designated a background image. These two images may contain textual information or graphic information or combinations thereof. One of the special features of this invention is the ability to easily integrate the foreground image and the background image on the final display without a significant processor load being required. This is due to the unique architecture which will be described with reference to FIGS. 3 and 4. This ability to merge foreground and background images in this invention provides for a graphic image which is contained as part of the foreground image, appearing to move across the dot display device by a foreground image passing over as apparently static background image. It is also possible to have a background appear as if it is passing behind a static image contained within the foreground image or to provide a combination of both images moving at the same time. This is accomplished without any significant load on the microprocessor used in the system. This feature significantly increases the ability of the display device of this invention to present images which are "attention getting".

THEORY OF OPERATION

Figure 2:
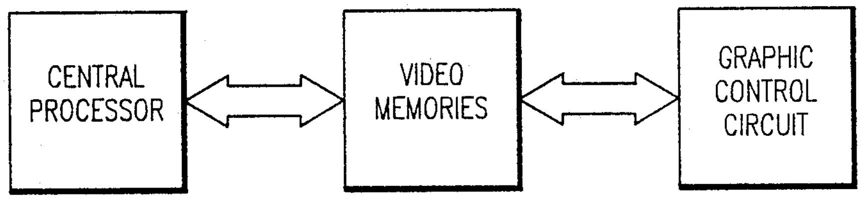
FIG. 2 is a general overview of the structure of one embodiment of this invention.

The basic structure of this invention is as shown in FIG. 2. Specifically a central processor 14 controls a block of video memories 160 which in turn store the data for use by the graphic control circuits 20.

Figure 3:
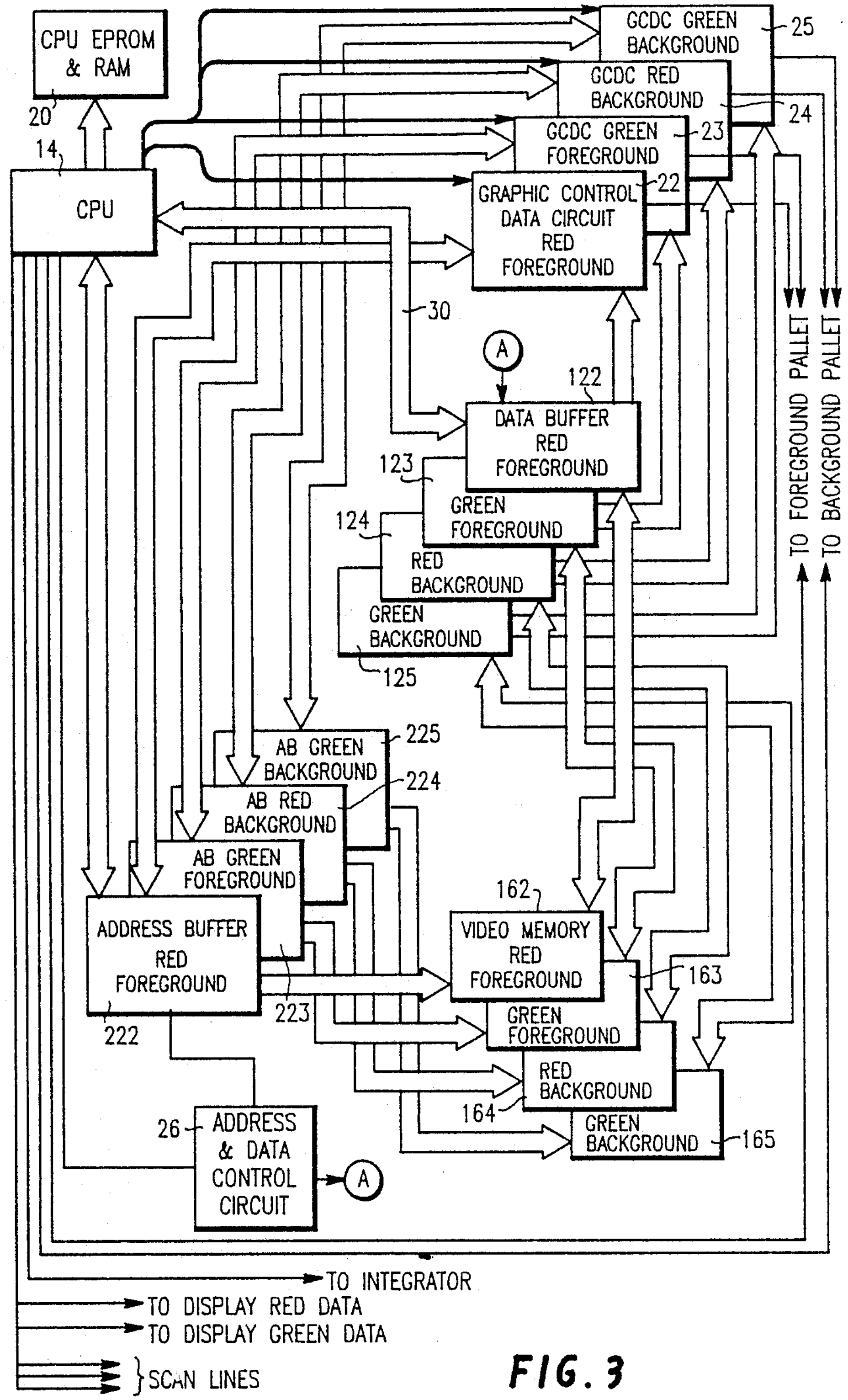
FIG. 3 is a logic diagram of this invention.

Now turning to FIG. 3 it will become apparent how data flows in the system and the control of this data from the CPU 14 (such as a Rockwell 6501AQ), through the video memory section 16 and the graphic control circuit 18. Specifically, the CPU 14 is connected by a address bus 28 to a plurality of address buffers 222, 223, 224 and 225 (such as a standard 74LS244) and by a data bus 30 to data buffers 122, 123, 124, and 125 (such as standard 74LS645) which provide the CPU access to a plurality of video memories 162, 163, 164 and 165, (such as static memory 6116's) which are components of the generic video memory 16 shown in FIG. 2. The respective address buffers and data buffers are also each connected to a respective graphic control data circuits, 22, 23, 24, and 25 which also have access to the video memories 162, 163, 164 and 165 through these same address buffers and data buffers. The determination as to whether or not an individual graphic control data circuit has access to its respective video memories or the CPU is controlled by an address and data control circuit 26 which is controlled by the CPU 14. When a given line of display elements is desired to be activated, in accordance with a preprogramed scanning function contained within the CPU 14, the CPU initiates the graphic control data circuits 22, 23, 24 and 25 and signals the address and data control circuit 26 so that the address buffers and data buffers for the respective video memories are attached to their respective graphic control data circuits. In this manner, independent of the CPU, the individual graphic control data circuits may access their respective video memories.

Referring in more detail now to FIG. 3 only one plane of the video memories and its respective set of data buffers, address buffers and graphic control data circuit will be discussed in detail. It should be apparent, however, from this description of "the one plane" that the multiple graphic control data circuits and multiple planes of memory as well as the associated data buffers and address buffers are all operational in a completed system. However, for a basic understanding of this invention only one layer will be discussed. At the start of a display sequence (i.e., the start of a scan at the top line of the display), the CPU initiates a command to the graphic control data circuit 22 (which in this case is arbitrarily designated as the red foreground graphic control data circuit). This initiation signal causes a reset in a line register (not shown in FIG. 3 but discussed and shown with respect to FIG. 6) contained in the graphic control data circuit The line register then causes a data buffer in the graphic control data circuit (not shown) to be set to receive the data for the first line to be displayed on the display device. Upon sending of this control signal to the graphic control data circuit 22, the CPU 14 additionally signals the address and data control circuit 26 so that circuit 26 switches access to the video memory and so that the graphic control data circuit 22 has access to the video memory 162 (which is designated in this case as the foreground red memory). In the second and third embodiments of this invention page information with respect to this plane of memory, i.e., the red foreground plane of memory, is provided directly from the CPU into the associated address buffer 222 for this plane of memory (this will be described below in more detail with respect to the second and third embodiments of this invention and in particular FIGS. 6 and 7). The line and byte information for a given plane of memory comes from the line and byte registers which are contained in the graphic control data circuit 22 (not shown). These line and byte registers are updated in accordance with which line of data in the memory plane and at which location in that line, data is to extracted by the Graphic Control Data Circuit 22. This allows the graphic control data circuit to "pull out" from the video memory the number of bits in memory that are equivalent to one line of a display and in particular with respect to this example the first line of "red" dots on the dot display device. Upon completion of the withdrawal of this information from the memory and the placement within the graphic control data circuit, an indication is given back to the CPU either by way of an interrupt or by way of conventional polling mechanisms that the graphic control data circuit 22 is finished extracting from its respective video memory.

The address & data control circuit 26 then releases the video memory from the graphic control data circuit and the access to the video memory is made available to the CPU. The data which has been extracted by the graphic control data circuit for a given line on the display is then held within the graphic control data circuit 22 and subsequently passed to the foreground pallet circuit which is shown and will be described with relation to FIG. 4. After the processing of this data by the pallet circuit and the integrator circuit (both of which will be described below) the process repeats with the exception being that the data for line 2 is now extracted from the memory. This involves the graphic control data circuit 22 resetting the byte counter and incrementing the internal line counter in the graphic control data circuit (as opposed to a reset that occurs with respect to line 1). This process will be repeated until the data for the last line of the display is extracted.

It should also be understood that the other Graphic Control data circuits shown in FIG. 3 are performing the same functions in synchronism with the Graphic Control data circuit discussed above. That is to say, the red and green foreground processing along with the red and green background processing, for example, with respect to line 1 of the display all four sets of images are processed simultaneously, with respect to line 2 all four planes are transferred to the respective Graphic Control Data Circuits.

Figure 4:
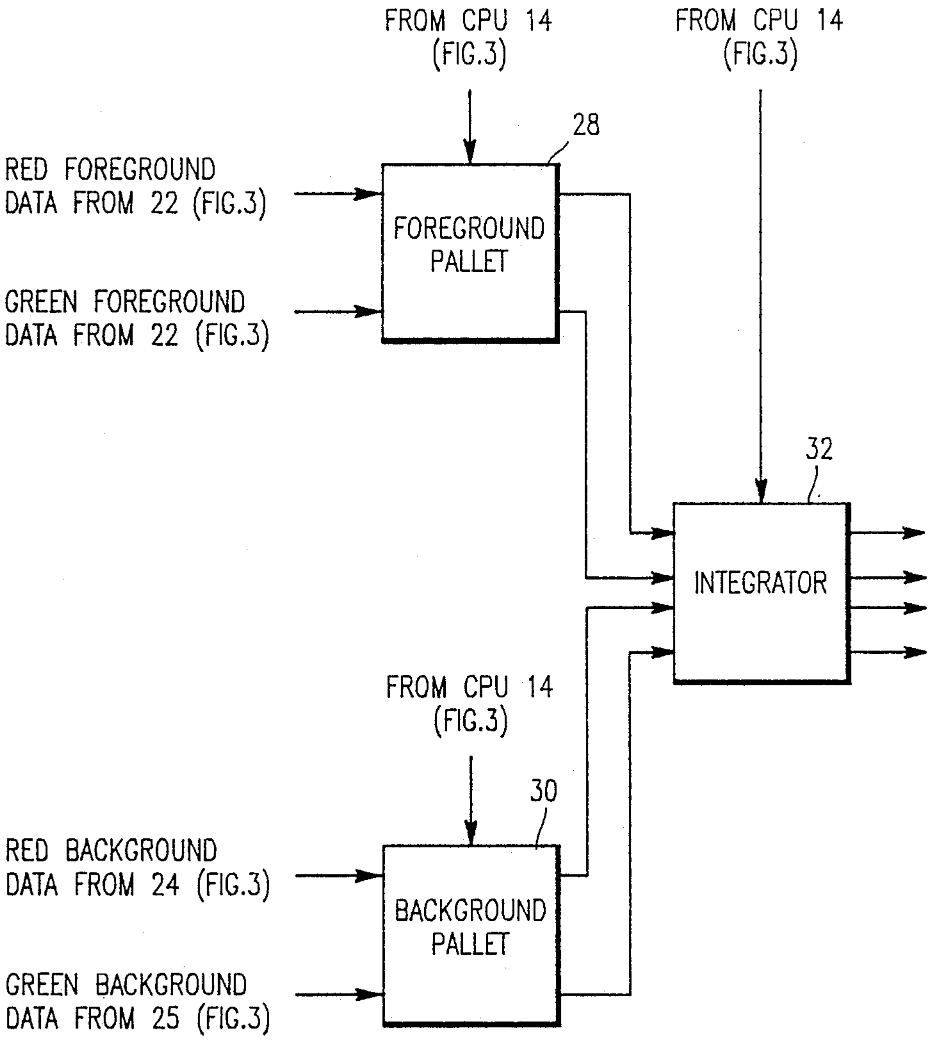
FIG. 4 is a logic diagram of the pallet and integrator circuits.

The pallet circuit shown in FIG. 4 comprises two pallet circuits, one for the foreground 28, and one for the background 30. However, the operation of the two pallets (foreground and background) operate in the same manner and are independent of each other and consequently only the operation of one pallet circuit will be described in detail. The foreground pallet circuit 28, for example, acts as a digital translation table or filter circuit for the color information coming from the two foreground graphic control data circuits 22 and 23 (i.e., the red and green foreground circuits) with respect to the foreground data and the background pallet receives and acts as a filter for the information from the graphic control data circuits 24 and 25 with respect to the background data. Each of the pallets also receives from the CPU a truth table which allows the pallet to translate the colors received from their respective graphic control data circuits. For simplicity, only the foreground pallet will be discussed at this point with an explanation as to how the foreground and background pallets work together being described below with respect to the integrator circuit.

With respect to the foreground pallet, input is received from the graphic control data circuits 22 and 23 representing for example the red or green dots respectively on a given line of the display. The pallet circuit in the "default" mode allows the red signal to pass through the pallet unchanged and the green signal to pass through the pallet unchanged with, when both of the indicators being true, both diodes (i.e., red and green) in the dot display being lit. If neither are lit then neither of the dots are lit on the final display. If either one is lit the respective color on the dot display is lit. However, on acceptance of a change signal from the CPU to the foreground pallet of a new truth table for the pallet the final color can be "toggled" or changed by the pallet circuit. Specifically, the CPU, by sending a simple (i.e., short) command to the foreground pallet, may determine that all green dots should be displayed as red and all red dots as green with the black dots remaining black and the orange dots remaining orange or any other combination or permutation thereof by simply changing the translation truth table held in the pallet circuit. Further, a cycling between the red, green, orange and black dots may be accomplished by changing the command that is sent to the foreground pallet by the CPU on successive display cycles. Consequently, this circuit provides a means by which the colors displayed by the dot display device may be changed very rapidly by the CPU without the necessity of rewriting the information in each of the video memories but rather by simply sending a simple command to the pallet. This is also true with respect to the image in the background pallet and these two devices may operate independently of each other so that the background display can be changed in a different manner from the foreground display or they may be changed in synchronism. This allows for extremely rapid color changes, without any significant CPU involvement, which provides for the possibility of an animation effect which occurs in the final display by way of color changes. An illusion of movement in the final display can be accomplished by changing the colors rapidly with virtually no processing load upon the CPU other than the requirement that the CPU issue simple commands to the individual pallets (i.e., foreground or background). This takes a significant processing load off the CPU.

The information from the two foreground and background pallets is then fed to an integrator 32 which determines the priority of dots appearing on the screen. The priority of dots is determined in a simple manner by determining if a dot in the foreground is lit a given color because it takes precedence over any dot in the background. If the dot in the foreground is blank (i.e. black) the color of the background picture then is displayed. By having this circuitry contained within the integrator rather than the CPU the determination of how a background picture and a foreground picture are superimposed upon each other is determined by a rather simple circuit which received the data to be displayed from the pallet circuits rather than requiring that the various memories be redrawn by the CPU when images in the foreground or background have moved to determine if a given foreground image has moved over a background image. Consequently, the load on the CPU is again reduced by way of the placement of the integrator "downstream" the pallet circuits.

Figure 5:
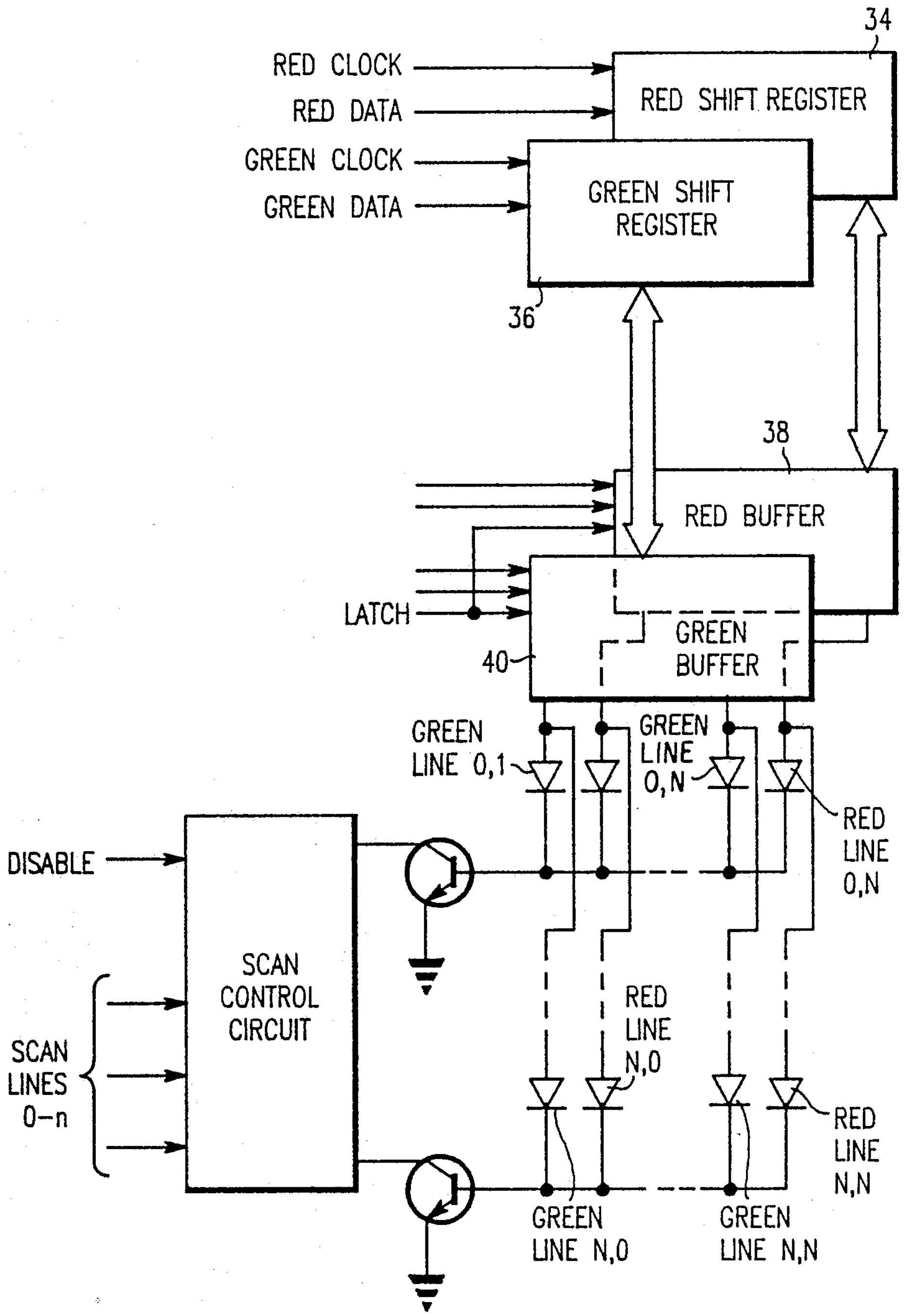
FIG. 5 is a logic/circuit diagram of the dot display driving circuit.

The actual driving of the dot display is accomplished by the circuitry shown in FIG. 5. The red and green data signals coming from the integrator 32 in FIG. 4 is fed to the red shift register 34 and a green shift register 36 in FIG. 5 respectively, over the red and green data lines as indicated. These signals are controlled by the red and green clock signals which are also provided to the shift registers respectively. Once the shift register contains an entire line of dot display information, the information is shifted from the red shift register 34 to the red buffer 38 and from the green shift register 36 to the green buffer 40 respectively and is held there by a latch control signal which is provided from the CPU 14. Once the information from the shift registers has been transferred to the buffers, these shift registers are then freed up so as to receive the next line of information to be provided to the lines of diodes. The diodes themselves are connected respectively to the buffers as indicated in FIG. 5. At each location there is the same number of diodes as there are buffers i.e. one red and one green which are lit in accordance with the information contained within the buffers 38 and 40 respectively. Which individual line of the dot display device is being lit at a given time is determined by the scan lines 0–N which are provided from the CPU 14. The number N is determined by the number of lines in the completed display (for example in a 16 line display N=3). A disable line is also provided from the CPU 14 to the scan control circuit 42. The scan control circuit drives the individual line of diodes through a conventional transistor driving circuit.

Figure 6:
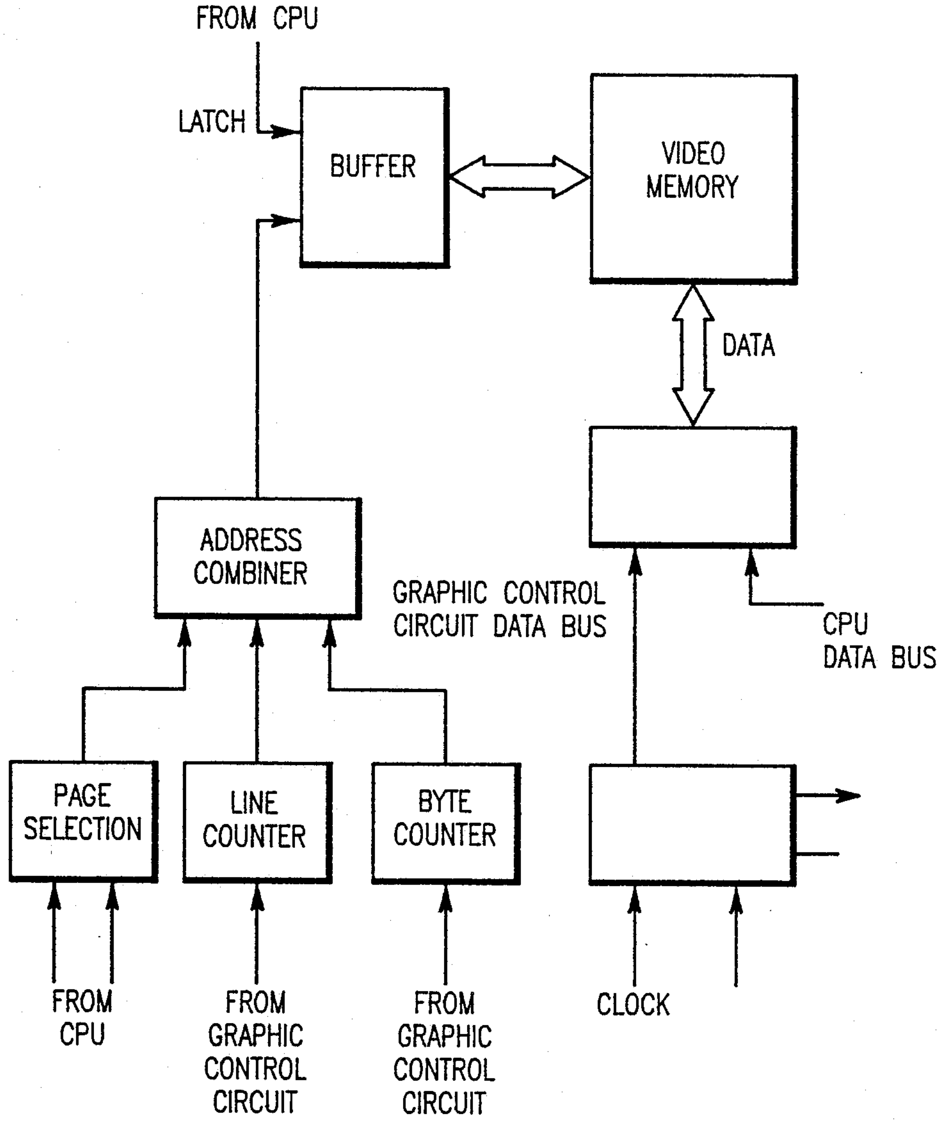
FIG. 6 is a general overview of the structure of an alternate embodiment of this invention.

In other embodiments of this invention the display size rather than being for example 64 lines by 128 dots the size may vary. For example a display of 32 lines by 128 dots or 16 lines by 128 dots may be provided. In the case of a 16 line by 128 dot display, such as is shown in FIG. 6 each of the individual memories shown in FIG. 3, 162, 163, 164 and 165 will then be subdivided into multiple pages. With respect to a 16 line display for example they are divided into eight "pages" of memory for the foreground and eight pages for the background with each of the pages being 16 bytes long (which gives 128 bits). This allows for the 16 lines on the display to be repeated within the memory four times. Two bits are reserved within the address buffer for each of the four planes of memory in order to select an appropriate page within each of the video memories. Each of the pages are stored within the address buffer and set by the CPU rather than the graphic control data circuit so that each graphic control data circuit, upon receiving a signal from the CPU to extract data from a video memory, extracts information with respect to a given line in one of the four pages of memory. Consequently at a given time, for example, the red foreground graphic control data circuit 22 may be extracting data from line 1 page 1 of its memory whereas the green foreground graphic control data circuit 23 may be extracting information from line 1 page 2 from the green foreground memory 162. Also, during this time the information or pages selected in the background red and green memories may be different from the foreground red and green memories and from each other for that matter.

It should be therefore evident that the additional necessary bits contained within the address buffers 222, 223, 224 and 225 are not provided by the associated graphic control data circuits 22, 23, 24 and 25 respectively but rather come from the CPU for each of the individual planes of memory. This allows a rapid change in images by the CPU by rapidly switching from the page at which an individual graphic control data circuit is extracting data from its associated memory. Additionally, various special effects can be accomplished on the final display by providing that the data is written in varying ways in each of the four pages of memory and rapidly switching between them.

In an embodiment using 32 lines by 128 dots an arrangement similar to that shown in FIG. 6 is used, however as 32 lines are necessary for the display, the video memory is divided into four pages rather than 8. This unique addressing ability allows for a rapid change in images which has been unavailable in prior art devices.

Further it should be evident that by merely increasing the "size" of the video memories the size of the dot display device may be increased.

Obviously, numerous modifications and variations of the present invention are possible in light of the above teachings. It is therefore to be understood that within the scope of the appended claims, the invention may be practiced otherwise than as specifically described herein.

I claim:

1. A device for controlling a multi-color dot matrix display device comprising:

a microprocessor;

a plurality of address buffers each coupled to said microprocessor;

a plurality of data buffers each coupled to said microprocessors;

a plurality of video memories planes wherein each video memory plane has an associated address buffer and an associated data buffer;

a plurality of graphic control data circuits wherein each graphic control data circuit is coupled to an associated data buffer and address buffer for receiving from said video memories planes a pattern to be displayed on said dot matrix display;

address and data control circuit coupled to said microprocessor, said address buffers and said data buffers for switching access to said plurality of video memories planes from said microprocessor to said plurality of graphic control data circuits; and display driving means coupled to said plurality of graphic control data circuits for converting said received, pattern into electrical signals for driving said dot matrix display.

2. A device as in claim 1, wherein said multicolor dot display comprises:

two colored elements per dot in the matrix.

3. A device as in claim 1, wherein said display driving means comprises: a pallet means coupled to said graphic control data circuits for altering the display.

4. A device as in claim 3, wherein said alteration is an alteration in the color displayed by said dot display device.

5. A device as in claim 1, wherein a foreground image is stored in one set of video memories and a background image is stored in a second set of video memories.

6. A device as in claim 5, wherein each set of video memories comprises:

two video memory planes and wherein each plane contains information with respect to one color of each image.

7. A device as in claim 6, wherein two pallets are provided and wherein one of said two pallets is coupled to the graphic control data circuits that are associated with the foreground image and a second of said two pallets is coupled to the graphic control data circuits that are associated with the background image.

* * * * *